United States Patent
Quinn et al.

(10) Patent No.: US 12,236,388 B2
(45) Date of Patent: Feb. 25, 2025

(54) MOUNTING DEVICE FOR CONTINUOUS HANDS-FREE SCANNING

(71) Applicant: UNITED STATES POSTAL SERVICE, Washington, DC (US)

(72) Inventors: Steven R. Quinn, Arlington, VA (US); Han T. Dinh, Falls Church, VA (US); Charles P. McLellan, Fairfax, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 102 days.

(21) Appl. No.: 17/131,112

(22) Filed: Dec. 22, 2020

(65) Prior Publication Data

US 2021/0192444 A1 Jun. 24, 2021

Related U.S. Application Data

(60) Provisional application No. 62/952,548, filed on Dec. 23, 2019.

(51) Int. Cl.
*B60R 11/00* (2006.01)
*G06Q 10/0833* (2023.01)
*G06Q 10/087* (2023.01)

(52) U.S. Cl.
CPC .......... *G06Q 10/0833* (2013.01); *B60R 11/00* (2013.01); *G06Q 10/087* (2013.01)

(58) Field of Classification Search
CPC ......... A47F 7/024; B60R 11/00; B65H 75/42; G06Q 10/0833; G06Q 10/087; H04M 1/15; Y10T 70/5009
USPC ........................................................ 224/562
See application file for complete search history.

(56) References Cited

U.S. PATENT DOCUMENTS

| | | | | |
|---|---|---|---|---|
| 4,842,174 A | * | 6/1989 | Sheppard | F16M 13/02 224/567 |
| 5,465,207 A | * | 11/1995 | Boatwright | B60R 11/02 701/52 |
| 5,845,885 A | * | 12/1998 | Carnevali | F16M 11/2078 248/484 |
| 6,799,356 B2 | * | 10/2004 | Sanchez | B23Q 11/08 29/284 |

(Continued)

FOREIGN PATENT DOCUMENTS

KR 20100004474 U * 4/2010

OTHER PUBLICATIONS

KR 20100004474 U Translation, 박영욱, Apr. 2010 (Year: 2010).*

*Primary Examiner* — Nathan J Newhouse
*Assistant Examiner* — Matthew T Theis
(74) *Attorney, Agent, or Firm* — MH2 Technology Law Group, LLP

(57) ABSTRACT

A scanning device mounting apparatus includes a mounting component, which may be magnetic; a hose coupled to the mounting component at a first distal end of the hose; an adjusting component coupled to a second distal end of the hose; and a cradle coupled to the adjusting component. The cradle can hold a scanning device, and the scanning device mounting apparatus is configured to position the scanning device in a manner that allows the scanning device to scan the labels on items that are being moved under or near the scanning device, such as packages or other items that are being loaded onto a delivery vehicle.

20 Claims, 3 Drawing Sheets

(56) References Cited

U.S. PATENT DOCUMENTS

| | | | | |
|---|---|---|---|---|
| 7,320,450 B2* | 1/2008 | Carnevali | ............. | F16M 11/14 |
| | | | | 248/180.1 |
| 7,525,696 B2* | 4/2009 | Carnevali | ............. | G06K 7/109 |
| | | | | 358/473 |
| 7,959,116 B2* | 6/2011 | Carnevali | ............. | F16M 11/40 |
| | | | | 248/163.1 |
| 2011/0163211 A1* | 7/2011 | Cicco | ............. | H04M 1/04 |
| | | | | 248/158 |
| 2015/0382489 A1* | 12/2015 | Sorensen | ............. | F16M 13/022 |
| | | | | 24/3.1 |

* cited by examiner

MOUNTING DEVICE FOR CONTINUOUS HANDS-FREE SCANNING

CROSS-REFERENCE TO RELATED APPLICATIONS

This application claims the benefit of and priority to U.S. Provisional Patent Application 62/952,548, which was filed on Dec. 23, 2019, and is incorporated herein by reference in its entirety.

BACKGROUND

Scanning devices are used to electronically read a label having a scanable or machine-readable portion (e.g., a barcode, a quick-response (QR) code, or the like). Scanning devices are often used for tracking a product or item (e.g., shipment tracking status, warehouse inventory tracking status, etc.). As an example, a product in transit (e.g. a delivery item) is scanned using a hand-held scanning device when loaded on to a delivery vehicle in order for to reflect tracking status of the product. A tracking system may receive an indication that the product was scanned by a scanning device linked to a delivery vehicle, and may accordingly update an electronic record storing the tracking status of the product.

SUMMARY

In one example aspect, an apparatus includes a magnetic mounting component, a hose having a first distal end and a second distal end, wherein the hose is coupled to the magnetic mounting component at the first distal end, an adjusting component coupled to the second distal end of the hose, and a cradle coupled to the adjusting component. The cradle is configured to hold a scanning device. In some embodiments, the hose is a semi-rigid hose. In some embodiments, the adjusting component includes a ball and socket swivel component. The cradle may include an adjustable recess that is configured to grasp a scanning device. The magnetic mounting component may include at least one of a neodymium magnet or a samarium cobalt magnet. The mounting component and adjusting components may be connected to the hose via threaded connections. In some embodiments, the apparatus may be mounted near a loading area of a vehicle. The apparatus may be mounted on a roof inside the vehicle or on a cargo door of the vehicle. In some embodiments, the apparatus may be configured to position the scanning device to continuously scan one or more item when mounted near the loading area of the vehicle.

In another example aspect, a system includes a vehicle and a scanning device mounting apparatus attached to the vehicle. The scanning device mounting apparatus may include a mounting component, a hose having a first distal end and a second distal end. The hose may be coupled to the mounting component at the first distal end. The apparatus may further include an adjusting component coupled to the second distal end of the hose, and a cradle coupled to the adjusting component. The cradle may be configured to hold a scanning device.

In another example aspect, a system includes a vehicle and a scanning device mounting apparatus attached within the vehicle. The scanning device mounting apparatus may include a magnetic mounting component. The apparatus may further include a hose having a first distal end and a second distal end. The hose may be coupled to the magnetic mounting component at the first distal end, an adjusting component coupled to the second distal end of the hose, and a cradle coupled to the adjusting component. The cradle may be configured to hold a scanning device.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

Using hand-held scanning devices to scan items upon loading on to a deliver vehicle requires the use of hands for operation, thus hindering, interrupting, and/or delaying the process of loading multiple items on to a delivery truck. For example, the person loading the vehicle must hold the scanner to scan a heavy item, put the scanner down in order to use two hands to lift the heavy item and place it in the vehicle, and then retrieve the scanner in order to scan the next item for loading into that vehicle. This process is inefficient, time-consuming, and risks loss or damage to the hand-held scanning device, among other drawbacks. Beneficially, aspects of the present disclosure may include a mounting device to mount a scanner within or on a delivery vehicle in a position that eliminates the need for physically holding the scanner, thus providing hands-free operation and addressing the drawbacks of hand-held scanning. In this way, products or items may be scanned continuously, without interruption, as they are loaded on to the delivery vehicle.

In various embodiments, the mounting device described herein is portable and lightweight, allowing the mounting device to be easily transferred for mounting or attaching at a suitable location on or within a delivery vehicle, such as a location that is near or in close proximity to the loading area of the vehicle. Also, the mounting device may be mounted to any type of structure within a vehicle, or on a structure or location other than a vehicle. Further the mounting device may include a variety of joints and/or other components for adjusting the position of the scanning device to optimize the scanner's performance. Moreover, the mounting device may be constructed with relatively inexpensive components that are simple to manufacture. Further, the mounting device may be adjustable to hold or mount a variety of different types of existing scanning devices, and may include a release mechanism to easily release the scanning device for conventional hand-held operation, if needed.

Figure 1:
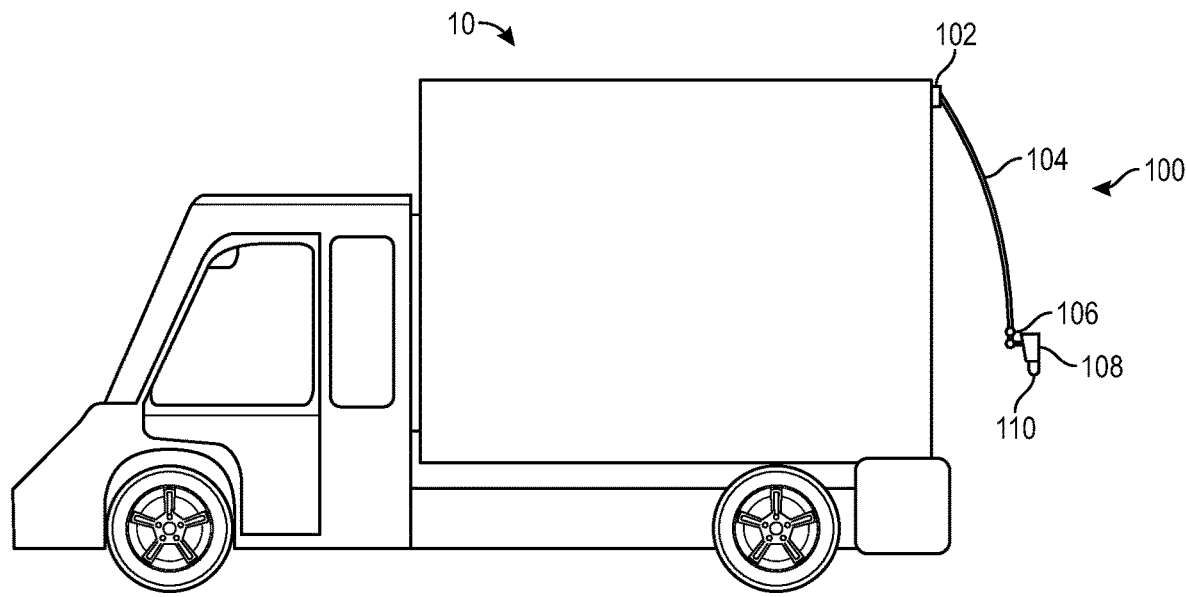
FIG. 1 illustrates a side view of a delivery vehicle implementing an example scanner mounting device in accordance with aspects of the present disclosure.

FIG. 1 illustrates a side view of a delivery vehicle implementing an example scanner mounting device in accordance with aspects of the present disclosure. In the example shown in FIG. 1, a scanner mounting device 100 may be mounted to a vehicle 10. The vehicle 10 may be a delivery truck, a van, or the like, for example, as used by delivery services such as the U.S. Postal Service, Federal Express Corp., United Parcel Services Corp., and the like. The scanning device mounting apparatus 100 may include a mounting component 102, a hose 104, an adjusting component 106, and a cradle 108. As described herein, the scanning device mounting apparatus 100 may secure a scanning device 110 in place.

The mounting component 102 may include a sticking or attracting component, which may provide temporary or removable attachment, such as a magnet (e.g., a neodymium magnet, a samarium cobalt magnet, or the like), a suction cup(s), or a removable adhesive. Additionally, or alternatively, the mounting component 102 may include any variety and combination of fasteners, such as screws, nuts, bolts, or the like and permanent adhesives. In some embodiments, the mounting component 102 may include a threaded bolt for attaching to the hose 104. The hose 104 may include a semi-rigid or semi-flexible hose or coil. In some alternative embodiments, the hose 104 may be replaced by another type of articulating member, such as a multi-jointed mechanical arm or the like. A first end of the hose 104 may attach to the mounting component 102 (e.g., magnetically, via a threaded connection, via welding, via fasteners, etc.). A second end of the hose 104 may attach to the cradle 108 (e.g., using threaded connections or other type of connections), and in various embodiments the cradle 108 may include or attach to the adjusting component 106. The cradle 108 may include a clasping device 421 to retain or hold a scanning device 110. As described herein, the configuration of the adjusting component 106 may be alterable such that the size of a receiving portion within the adjusting component 106 can be changed in order for the adjusting component 106 to receive and retain different scanner devices 110 having different sizes and shapes.

In operation, the scanning device mounting apparatus 100 may be mounted near the cargo door at the rear of the vehicle 10 as shown, for example on the roof or the upper area of the rear sides. In embodiments, the position and orientation of the scanning device 110 may be adjusted so as to optimize its scanning performance by manipulating the mounting apparatus 100, particularly the hose 104 of the mounting apparatus 100. More specifically, the position of the scanning device 110 may be adjusted such that a scanning beam produced by the scanning device 110 is facing or pointing downwards so as to scan a label on an item or product facing upwards. As described herein, the position of the scanning device 110 may be adjusted by adjusting the arc or bend shape of the hose 104 (e.g., by physically applying force to the hose 104 to modify the arc and bend shape). As the hose 104 is semi-rigid, the bend shape of the hose 104 may be unaffected without deliberate applications of force for modifying the bend shape; e.g., the hose 104 will hold its shape after being manipulated. The position of the scanning device 110 (e.g., the direction that the scanning device 110 is facing) may further be adjusted by adjusting the swivel position using the swivel joint assembly 106. Additional details regarding the joint assembly 106 are described in greater detail below with respect to FIG. 4.

Figure 2:
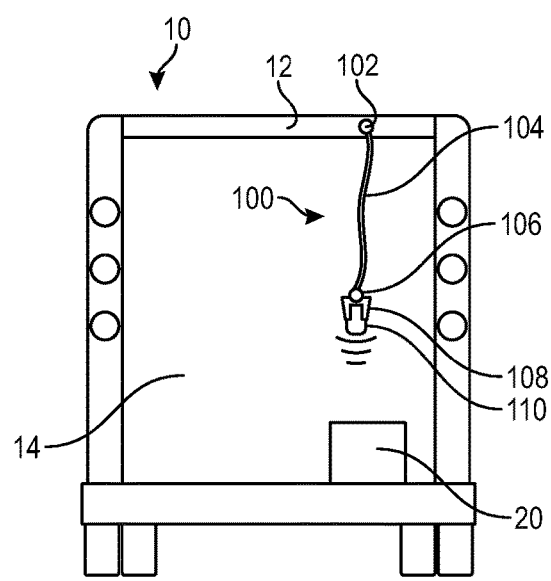
FIG. 2 illustrates a rear view of delivery vehicle implementing an example scanner mounting device in accordance with aspects of the present disclosure.

FIG. 2 illustrates a rear view of a delivery vehicle implementing an example scanner mounting device in accordance with aspects of the present disclosure. As shown in the example of FIG. 2, the scanning device mounting apparatus 100 may be mounted to a structure or mounting section 12 of the vehicle 10 and may hang in the manner shown. In this way, the mounting apparatus 100 may place or position the scanning device 110 so that it is facing downward in order to scan a package 20 (or other item) as the package 20 is loaded on the vehicle 10 through the door opening 14 and into the loading area of the vehicle. Thus, as a person carries the package 20 to the vehicle 10 and puts the package 20 into the loading area of the vehicle 10, the package 20 naturally passes through the area that is being scanned under the scanning device 110, such that the scanning device 110 reads any label, bar code, or the like that is on the package 20 and within view of the scanning device 110, such as a bar-coded address label that is on the top of the package 20.

Figure 3:
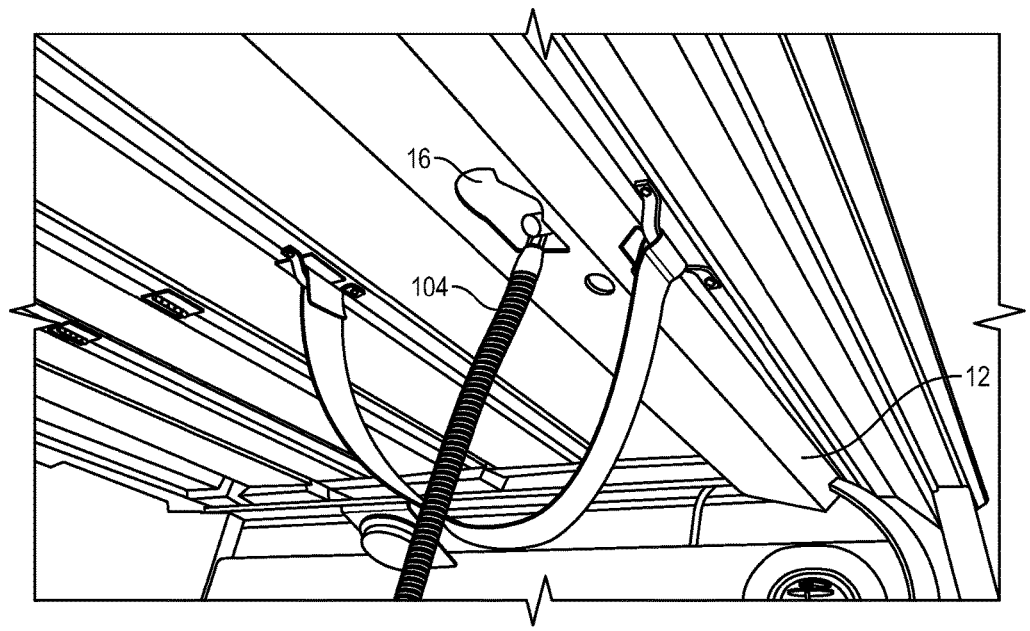
FIG. 3 illustrates additional details of the mounting frame whereby the scanning device mounting apparatus 100 may be mounted.

In some embodiments, the mounting section 12 may be part of a track door of the vehicle, as described in greater detail with respect to FIG. 3. In various embodiments, the mounting section 12 may be made of a magnetic metal such as steel, and the mounting component 102 may include a magnet that attaches the scanning device mounting apparatus 100 to the frame 12 during loading, and that allows the scanning device mounting apparatus 100 to be removed after loading is completed.

By mounting the scanning device 110 using the scanning device mounting apparatus 100 at a location that is near or in close proximity to the loading area, the scanning device mounting apparatus 100 may provide hands-free operation of the scanning device 110 to facilitate continuous scanning, which obtains data from the packages 20 as the packages 20 are loaded. In this way, a group of packages may be loaded much more quickly in relation to when the scanning device 110 is operated manually because, for example, the person loading the packages 20 can use two hands to carry a heavy package 20 without interruption for hand-held scanning and can carry two light packages 20 at a time—one in each hand. In various embodiments, the information that is automatically scanned from the packages 20 upon loading may be used for updating a package tracking system.

FIG. 3 illustrates additional details of the mounting section 12 whereby the scanning device mounting apparatus 100 may be mounted. As shown in the example of FIG. 3, the mounting section 12 may be an end of a door and may include a cutout 16. The mounting component 102 may be magnetically mounted within the cutout 16 (e.g., to a magnetic surface of the mounting section 12 within the cutout 16. In some embodiments, the cutout 16 may be a keeper for a locking latch of the door, but may be used to also mount the scanning device mounting apparatus 100. In some embodiments, modifications or variations may be implemented for mounting the scanning device mounting apparatus 100 to the vehicle 10. For example, the mounting section 12 may include a horizontal slot extending to any length of choice, whereby the scanning device mounting apparatus 100 may be mounted at any position along the horizontal slot.

Figure 4:
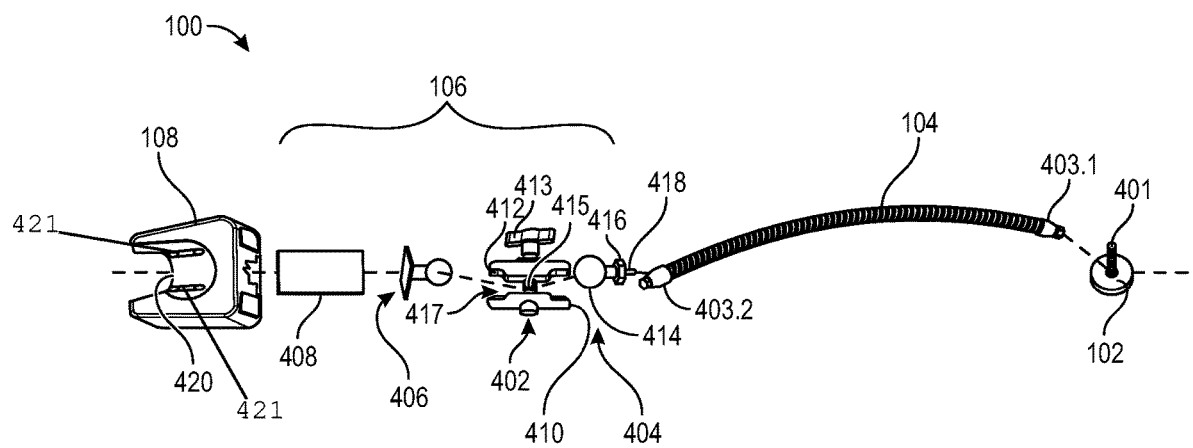
FIG. 4 illustrates an exploded view of an example of the scanning device mounting apparatus 100 and details of components of the scanning device mounting apparatus 100 in accordance with aspects of the present invention.

FIG. 4 illustrates an exploded view of an example of the scanning device mounting apparatus 100 and details of components of the scanning device mounting apparatus 100 in accordance with aspects of the present invention. In the example shown in FIG. 4, the scanning device mounting apparatus 100 may include a mounting component 102, a hose 104, an adjusting component 106, and a cradle 108. The mounting component 102 may include a threaded hole or a threaded bolt 401. The hose 104 may be or include a semi-rigid or semi-flexible hose, coil, adjustable gooseneck shaft, or the like, having threaded ends 403.1 and 403.2 provided at opposite distal ends of the hose 104. The adjusting component 106 may include a ball and socket swivel assembly 402 having spherical component 404, a first spherical stud 414, a second spherical stud 406, a mounting plate 408, and first and second brackets 410, 412, which form sockets for the balls of the spherical studs 414, 406. The first spherical stud 414 may include a nut 416 and a threaded bolt 418. The ball and socket swivel assembly 404 may include a knob 413 threaded onto to or coupled to a threaded bolt 415, which is coupled to the second bracket 410, such that turning the knob 413 moves the first and second brackets 410, 412 toward or away from each other.

As shown in FIG. 4, the mounting component 102 may connect to a first distal end (i.e., the threaded end 403.1) of the hose 104 via the threaded bolt 401 and the threaded end 403.1. The ball and socket swivel assembly 404 may connect to a second distal end (i.e., the threaded end 403.2) of the hose 104 via the threaded bolt 418 and threaded end 403.2. The nut 416 may be used to tighten the connection between the ball and socket swivel assembly 404 and the hose 104. The first and second brackets 410, 412 may be coupled together to via the threaded bolt 415, forming sockets 417 for receiving and retaining the spherical studs 414, 406. The mounting plate 408 may be coupled to the spherical stud 406 (e.g., using mounting hardware, fasteners, adhesive, etc.), and the mounting plate 408 may be coupled to the cradle 108 (e.g., using mounting hardware, fasteners, adhesive, etc.). As previously discussed, the cradle 108 may be configured to hold or retain a scanning device 110 (e.g., within a recess 420). The cradle 108 may be configured such that the size of the recess 420 may be adjusted, enlarged, and/or reduced to accommodate and grasp different sizes of different scanning devices 110, for example, using sliding parts 421, ratcheting parts, or the like.

In operation, the position of the spherical studs 414, 406 may be adjusted or swiveled or rotated up to 360 degrees using the knob 413. More specifically, the size of the sockets 417 may be increased using the knob 413, thereby loosening the grip on the spherical studs 414, 406. When loosened, the ball joints 404, 406 may be moved for adjusting the position of the cradle 108 and hence, any scanning device 110 that is placed in the cradle. The spherical studs 414, 406 may be tightened (e.g., using the knob 413) to lock or retain the spherical studs 414, 406 in position. Also, the hose 104 may be manually adjusted by bending the hose 104 to a desired position and bend shape. The semi-rigid nature of the hose 104 may retain the position and bend shape of the hose 104 in place, absent of deliberate and manual adjustments. Thus, the hose 104 may also be used to adjust, place, or position of the cradle 108 in a manner that enables a scanning device 110 held within the cradle 108 to operate as described herein. It is to be understood that the arrangement of components of the scanning device mounting apparatus 100 may be different than that shown in various other embodiments, and the components and connections shown in FIG. 4 are purely for illustrative purposes.

Figure 5:
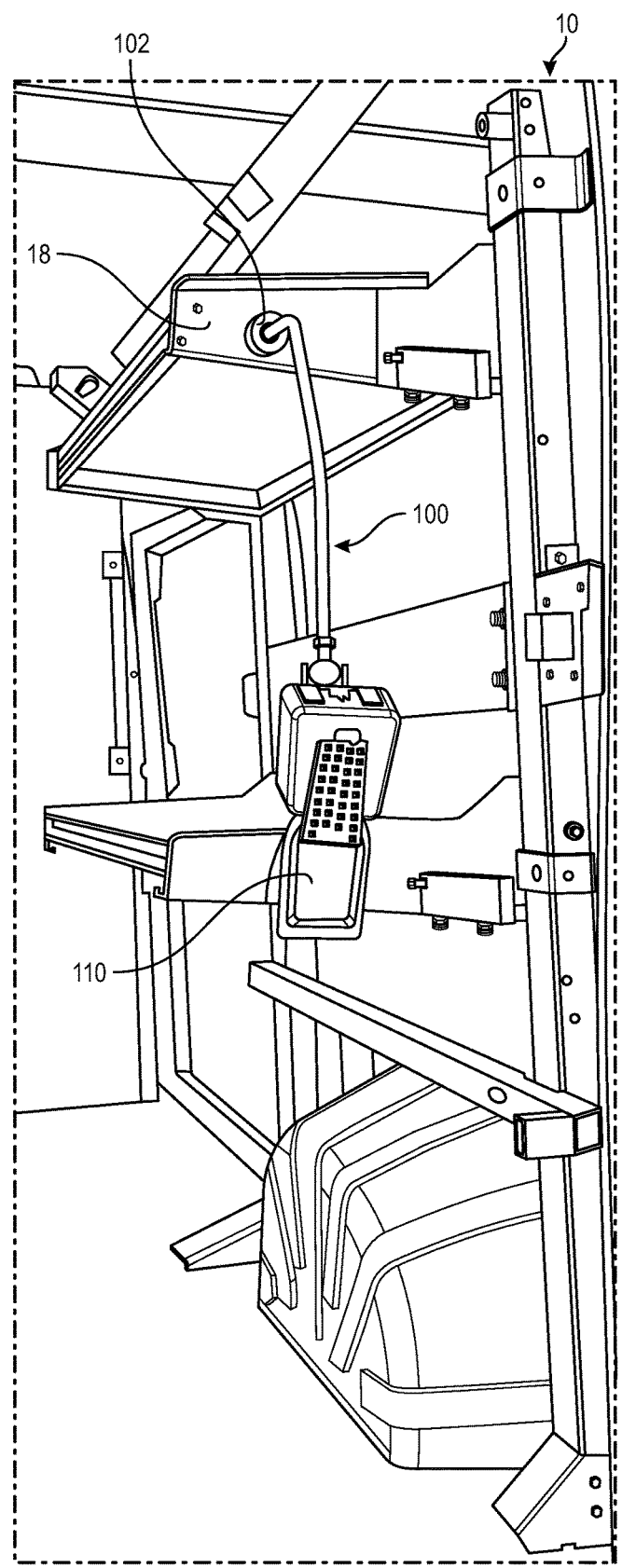
FIG. 5 illustrates an example implementation for attaching or mounting the scanning device mounting apparatus 100 in an alternative location, according to an embodiment.

FIG. 5 illustrates an example implementation for attaching the scanning device mounting apparatus 100 in an alternative location, according to an embodiment. As shown in FIG. 5, the scanning device mounting apparatus 100 may be mounted or attached within a vehicle 10, for example, on a shelf 18 of the vehicle 10 that is near the cargo door in the loading area. As one illustrative example, the shelf 18 may be made of a ferrous metal, such as steel, and the scanning device mounting apparatus 100 may be magnetically mounted via a magnetic mounting component 102. Alternatively, since the scanning device mounting apparatus 100 is versatile and portable, the scanning device mounting apparatus 100 may be mounted at any other location (e.g. the inside of the roof of the vehicle 10) that is convenient and that enables hands-free package scanning by the scanning device 110.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. For example, some components, described as being separate pieces or parts, may be integrated into one component. Similarly, one component may be divided into one or more sub-components, pieces, or parts. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used.

What is claimed is:

1. An apparatus comprising:
 a magnetic mounting component;
 a hose having a first distal end and a second distal end, wherein the hose is coupled to the magnetic mounting component at the first distal end;
 a first spherical stud;
 an adjusting component coupled to the second distal end of the hose via the first spherical stud, the adjusting component consisting of: a first bracket and a second bracket, a knob, and a bolt that is coupled with the knob; wherein the knob and the bolt move the first bracket and the second bracket towards or away from each other, and wherein the first bracket and the second bracket form sockets for the first spherical stud and a second spherical stud; and
 a cradle coupled to the adjusting component via the second spherical stud and enabling 360° of rotation of the cradle,
 wherein the cradle is configured to hold a scanning device such that a scanning beam of the scanning device faces downward to scan labels on items facing upwards,
 wherein the magnetic mounting component is configured to mount within a keeper for a locking latch of a track door of a vehicle when the track door is positioned above a loading area of the vehicle, wherein the scanning device operates hands-free to scan the items loaded through a door opening of the vehicle, wherein an arc of the hose can be adjusted and re-adjusted by applying physical force to the hose to adjust a position of the scanning device, and wherein the magnetic mounting component is configured to be removed after loading is completed.

2. The apparatus of claim 1, wherein the hose is a semi-rigid hose.

3. The apparatus of claim 1, wherein the adjusting component comprises a mounting plate.

4. The apparatus of claim 1, wherein the cradle includes at least one feature in a recess that is configured to grasp the scanning device.

5. The apparatus of claim 1, wherein the magnetic mounting component comprises at least one of a neodymium magnet or a samarium cobalt magnet.

6. The apparatus of claim 1, wherein the magnetic mounting component and the adjusting component are connected to the hose via threaded connections.

7. The apparatus of claim 1, wherein the apparatus is configured to mount above the loading area of the vehicle.

8. The apparatus of claim 7, wherein the track door is a cargo door of the vehicle.

9. The apparatus of claim 7, wherein the apparatus is configured to position the scanning device to continuously scan one or more item when mounted above the loading area of the vehicle.

10. A system comprising:
a vehicle comprising a loading area; and
a scanning device mounting apparatus attached to the vehicle, wherein the scanning device mounting apparatus comprises:
a magnetic mounting component that is configured to attach to the vehicle near the loading area;
a hose having a first distal end and a second distal end, wherein the hose is coupled to the magnetic mounting component at the first distal end;
a first spherical stud;
an adjusting component coupled to the second distal end of the hose via the first spherical stud, the adjusting component consisting of: a first bracket and a second bracket, a knob, and a bolt that is coupled with the knob; wherein the knob and the bolt move the first bracket and the second bracket towards or away from each other, and wherein the first bracket and the second bracket form sockets for the first spherical stud and a second spherical stud; and
a cradle coupled to the adjusting component via the second spherical stud and enabling 360° of rotation of the cradle,
wherein the cradle is configured to hold a scanning device such that a scanning beam of the scanning device faces downward to scan labels on items facing upwards, wherein the magnetic mounting component is configured to mount within a keeper for a locking latch of a track door of the vehicle when the track door is positioned above the loading area of the vehicle, wherein the scanning device operates hands-free to scan the items loaded through a door opening of the vehicle, wherein an arc of the hose can be adjusted and re-adjusted by applying physical force to the hose to adjust a position of the scanning device, and wherein the magnetic mounting component is configured to be removed after loading is completed.

11. The system of claim 10, wherein the hose is a semi-rigid hose.

12. The system of claim 10, wherein the adjusting component comprises a mounting plate.

13. The system of claim 10, wherein the magnetic mounting component and the first spherical stud are connected to the hose via threaded connections.

14. The system of claim 10, wherein the scanning device mounting apparatus is configured to mount accessible to the loading area of the vehicle.

15. The system of claim 14, wherein the track door is a cargo door of the vehicle.

16. The system of claim 14, wherein the scanning device mounting apparatus is configured to position the scanning device to continuously scan one or more item when mounted accessible to the loading area of the vehicle.

17. A system comprising:
a vehicle; and
a scanning device mounting apparatus attached within the vehicle, wherein the scanning device mounting apparatus comprises:
a magnetic mounting component;
a hose having a first distal end and a second distal end, wherein the hose is coupled to the magnetic mounting component at the first distal end;
a first spherical stud;
an adjusting component coupled to the second distal end of the hose via the first spherical stud, the adjusting component consisting of: a first bracket and a second bracket, a knob, and a bolt that is coupled with the knob; wherein the knob and the bolt move the first bracket and the second bracket towards or away from each other, and wherein the first bracket and the second bracket form sockets for the first spherical stud and a second spherical stud; and
a cradle coupled to the adjusting component via the second spherical stud and enabling 360° of rotation of the cradle,
wherein the cradle is configured to hold a scanning device such that a scanning beam of the scanning device faces downward to scan labels on items facing upwards, wherein the magnetic mounting component is configured to mount within a keeper for a locking latch of a track door of the vehicle when the track door is positioned above a loading area of the vehicle, wherein the scanning device operates hands-free to scan the items loaded through a door opening of the vehicle, wherein an arc of the hose can be adjusted and re-adjusted by applying physical force to the hose to adjust a position of the scanning device, and wherein the magnetic mounting component is configured to be removed after loading is completed.

18. The system of claim 17, wherein the magnetic mounting component comprises at least one of a neodymium magnet or a samarium cobalt magnet.

19. The system of claim 17, wherein the scanning device mounting apparatus is configured to mount above the loading area of the vehicle.

20. The system of claim 17, wherein the scanning device mounting apparatus is configured to position the scanning device to continuously scan one or more item when mounted above the loading area of the vehicle.

* * * * *